US012592162B2

(12) United States Patent
Fujisawa

(10) Patent No.: US 12,592,162 B2
(45) Date of Patent: Mar. 31, 2026

(54) FLIGHT SIMULATION SYSTEM

(71) Applicant: SUBARU CORPORATION, Tokyo (JP)

(72) Inventor: Hiroshi Fujisawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 441 days.

(21) Appl. No.: 18/140,802

(22) Filed: Apr. 28, 2023

(65) Prior Publication Data

US 2023/0386357 A1 Nov. 30, 2023

(30) Foreign Application Priority Data

May 25, 2022 (JP) ................................. 2022-085459

(51) Int. Cl.
*G09B 9/24* (2006.01)
*G06F 3/01* (2006.01)
(Continued)

(52) U.S. Cl.
CPC .............. *G09B 9/24* (2013.01); *G06F 3/012* (2013.01); *G06F 3/016* (2013.01); *G06F 3/0488* (2013.01); *G09B 9/302* (2013.01); *G09B 9/307* (2013.01)

(58) Field of Classification Search
CPC .......... G09B 9/24; G09B 9/302; G09B 9/307; G09B 9/165; G06F 3/012; G06F 3/06;
(Continued)

(56) References Cited

U.S. PATENT DOCUMENTS

| | | | |
|---|---|---|---|
| 10,884,525 | B1 | 1/2021 | Vonsik et al. |
| 2016/0019808 | A1 | 1/2016 | Chavez et al. |

(Continued)

FOREIGN PATENT DOCUMENTS

| | | |
|---|---|---|
| CN | 114360312 A | 4/2022 |
| EP | 2755114 A2 | 7/2014 |

(Continued)

OTHER PUBLICATIONS

Extended European Search Report dated Oct. 17, 2023, in corresponding European Patent Application No. 23173532.5.

(Continued)

*Primary Examiner* — Pierre E Elisca
(74) *Attorney, Agent, or Firm* — MCGINN I.P. LAW GROUP, PLLC

(57) ABSTRACT

A flight simulation system for performing flight simulation of aircraft models includes a head-mounted display for displaying a virtual reality image of a cockpit including operational interfaces, a haptic device including a touch sensor for detecting a touch location touched by a user and a vibrator for causing a vibration, and a control device including a processor and a memory. The processor execute a process including: performing flight simulation of a model selected by the user; causing the head-mounted display to display the virtual reality image picturing the operational interfaces; when the user touches the haptic device, causing the vibrator to cause a vibration at the touch location; based on coordinate data indicating coordinate locations of the operational interfaces and the touch location, identifying an operational interface corresponding to the touch location; and applying a change based on an operation performed on the identified operational interface to flight simulation.

8 Claims, 9 Drawing Sheets

(51) Int. Cl.
    *G06F 3/0488*     (2022.01)
    *G09B 9/30*     (2006.01)

(58) Field of Classification Search
    CPC .... G06F 3/0488; G06F 3/011; G06F 3/04847;
                             G06F 3/03547
    USPC .......................................................... 434/4
    See application file for complete search history.

(56)               References Cited

U.S. PATENT DOCUMENTS

| | | |
|---|---|---|
| 2016/0093230 A1 | 3/2016 | Boggs et al. |
| 2017/0293351 A1 | 10/2017 | Li |
| 2018/0228556 A1 | 8/2018 | Schweizer |
| 2019/0244537 A1* | 8/2019 | Liberatore ............ G06F 3/0205 |
| 2020/0098185 A1 | 3/2020 | Schradin et al. |
| 2021/0074173 A1* | 3/2021 | Liberatore ............... G09B 9/08 |
| 2021/0327295 A1 | 10/2021 | Heyd et al. |
| 2022/0335850 A1* | 10/2022 | Klassen ................. G06N 3/049 |
| 2023/0386357 A1* | 11/2023 | Fujisawa ................. G06F 3/011 |

FOREIGN PATENT DOCUMENTS

| | | |
|---|---|---|
| JP | 2010-015360 A | 1/2010 |
| JP | 2020-013035 A | 1/2020 |
| JP | 2021-513122 A | 5/2021 |

OTHER PUBLICATIONS

Japanese Office Action dated Dec. 9, 2025 for Japanese Patent Application No. 2022-085459 with English translation thereof.

\* cited by examiner

FIG. 9

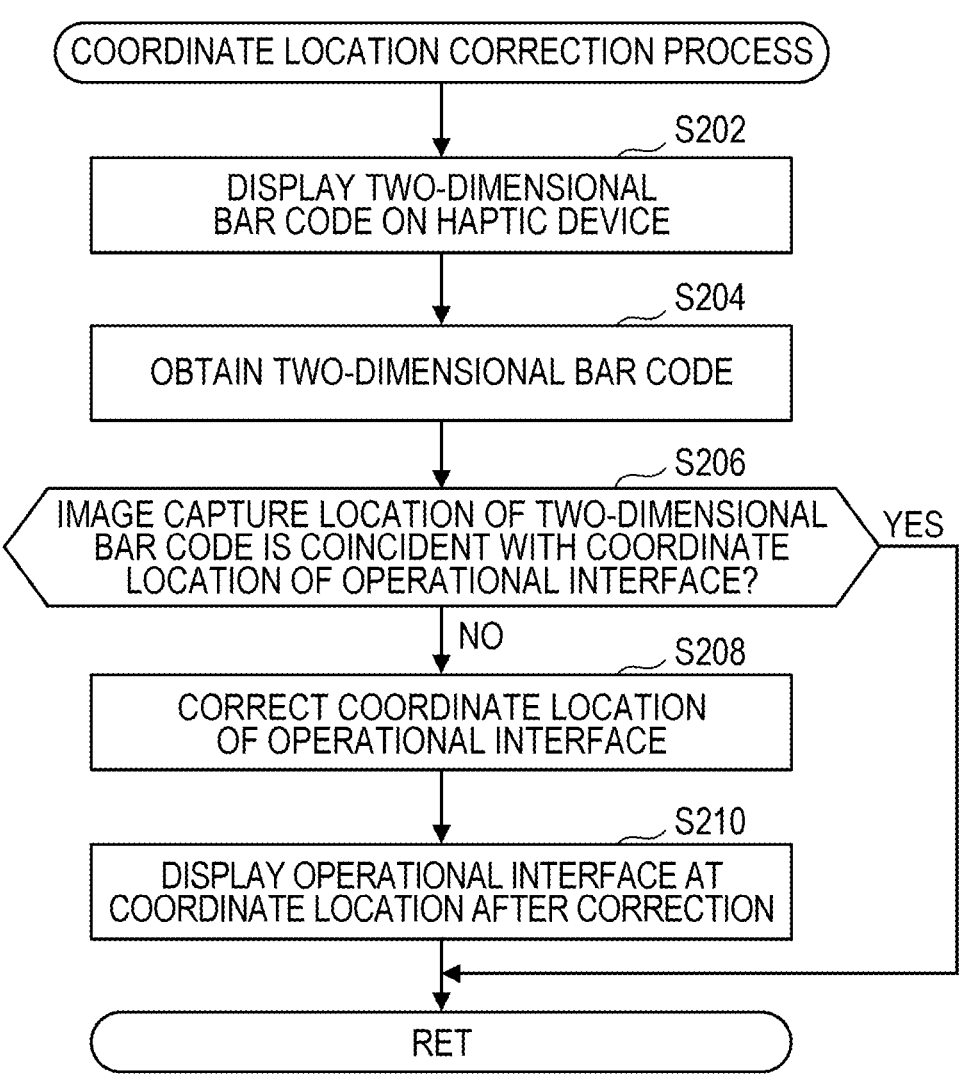

COORDINATE LOCATION CORRECTION PROCESS

S202

DISPLAY TWO-DIMENSIONAL
BAR CODE ON HAPTIC DEVICE

S204

OBTAIN TWO-DIMENSIONAL BAR CODE

S206

IMAGE CAPTURE LOCATION OF TWO-DIMENSIONAL
BAR CODE IS COINCIDENT WITH COORDINATE
LOCATION OF OPERATIONAL INTERFACE?

YES

NO

S208

CORRECT COORDINATE LOCATION
OF OPERATIONAL INTERFACE

S210

DISPLAY OPERATIONAL INTERFACE AT
COORDINATE LOCATION AFTER CORRECTION

RET

FLIGHT SIMULATION SYSTEM

CROSS-REFERENCE TO RELATED APPLICATIONS

The present application claims priority from Japanese Patent Application No. 2022-085459 filed on May 25, 2022, the entire contents of which are hereby incorporated by reference.

BACKGROUND

The disclosure relates to a flight simulation system.

Some known flight simulation systems include dome screens. With these flight simulation systems including dome screens, a reproduction of an aircraft cockpit seat is made inside the dome, and simulated experiences of actual aircraft flight are provided in an exact manner. On the other hand, the flight simulation systems including dome screens usually occupy relatively large space, and additionally, this kind of systems are costly. There are other small-scale and low-cost technologies for providing simulated experiences of actual aircraft flight. One example is the flight simulation system using a head-mounted display described in Japanese Unexamined Patent Application Publication (Translation of PCT Application) (JP-T) No. 2021-513122.

SUMMARY

An aspect of the disclosure provides a flight simulation system configured to perform flight simulation of models of aircrafts. The flight simulation system includes a head-mounted display, a haptic device, and a control device. The head-mounted display is wearable by a user, configured to display a virtual reality image of a cockpit of an aircraft in a virtual space. The haptic device is disposed in a real space at a location corresponding to operational interfaces provided in the cockpit in the virtual reality image. The control device is configured to control the flight simulation using the head-mounted display and the haptic device. The haptic device includes a touch sensor configured to detect a touch location touched by the user on the haptic device and a vibrator configured to cause a vibration at the touch location. The control device includes a processor and a memory configured to store coordinate data indicating coordinate locations of the operational interfaces provided in the cockpit of each of the models. The processor is configured to execute a process including: performing flight simulation of a model selected by the user from the models; causing the head-mounted display to display the virtual reality image picturing the operational interfaces of the selected model; when the user touches the haptic device, causing the vibrator to cause a vibration at the touch location; based on the coordinate data of the selected model and the touch location, identifying an operational interface corresponding to the touch location among the operational interfaces of the selected model; and applying a change based on an operation performed on the identified operational interface to the flight simulation of the selected model.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 9 is a flowchart illustrating a coordinate location correction process performed by the control device according to the embodiment.

DETAILED DESCRIPTION

The above-mentioned flight simulation system using a known head-mounted display, described in JP-T No. 2021-513122, includes physical input hardware of human machine interfaces (HMIs) such as a control yoke, rudder pedals, and switches. However, the arrangement of operational interfaces such as an instrument panel and various kinds of switches can differ among different models of aircrafts. For this reason, to provide flight simulation of different models of aircrafts, HMIs are to be prepared for the individual aircraft models. This makes it difficult for a single flight simulation system to handle multiple models of aircrafts.

It is desirable to provide a flight simulation system with low costs and high general applicability.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
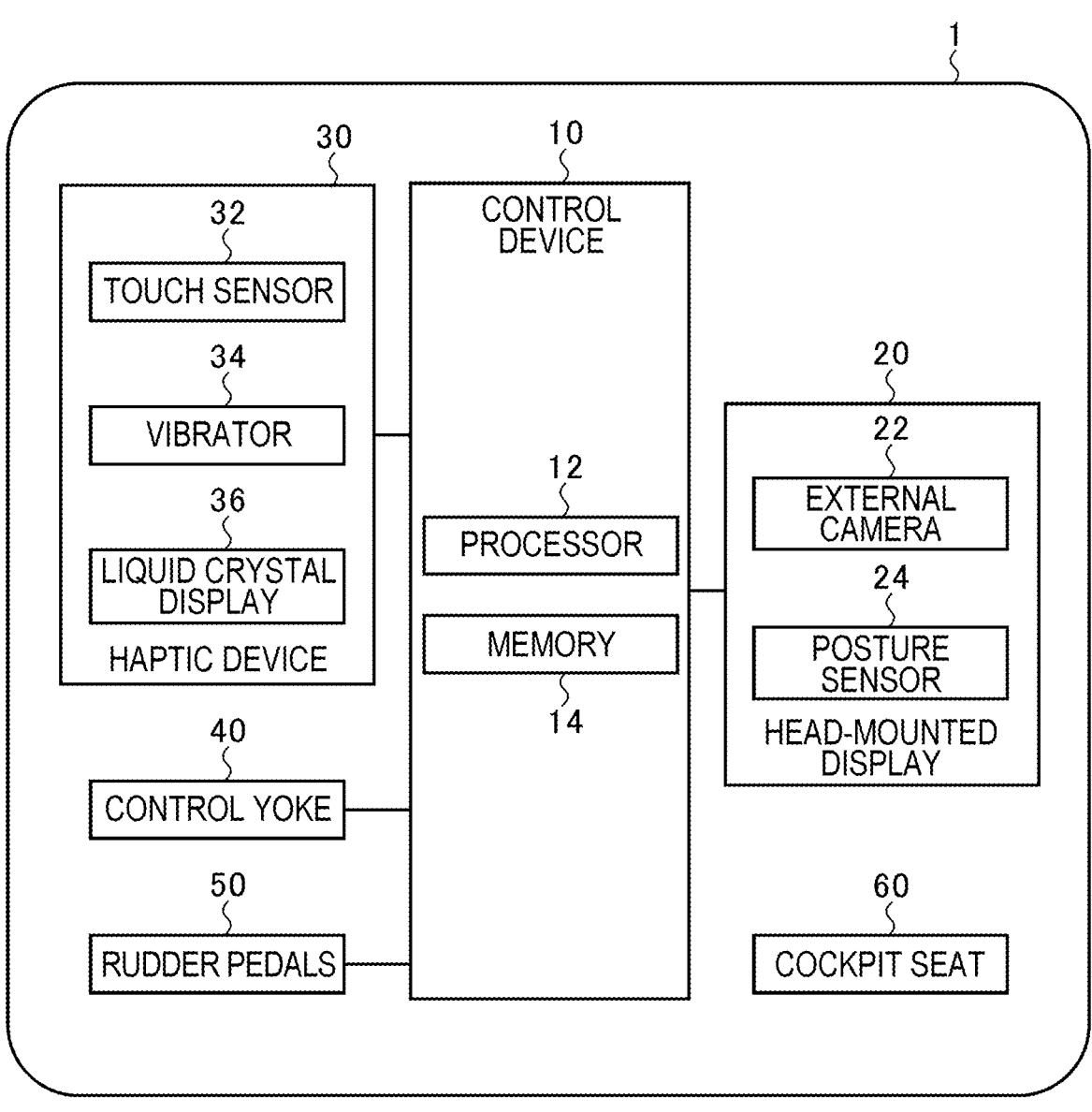
FIG. 1 schematically illustrates an overall configuration of a flight simulation system according to an embodiment.

1. Overall Configuration of Flight Simulation System According to First Embodiment Firstly, the overall configuration of a flight simulation system 1 according to a first embodiment of the disclosure will be described with reference to FIGS. 1, 2, and 3. FIG. 1 schematically illustrates an overall configuration of the flight simulation system 1 according to the first embodiment.

Figure 2:
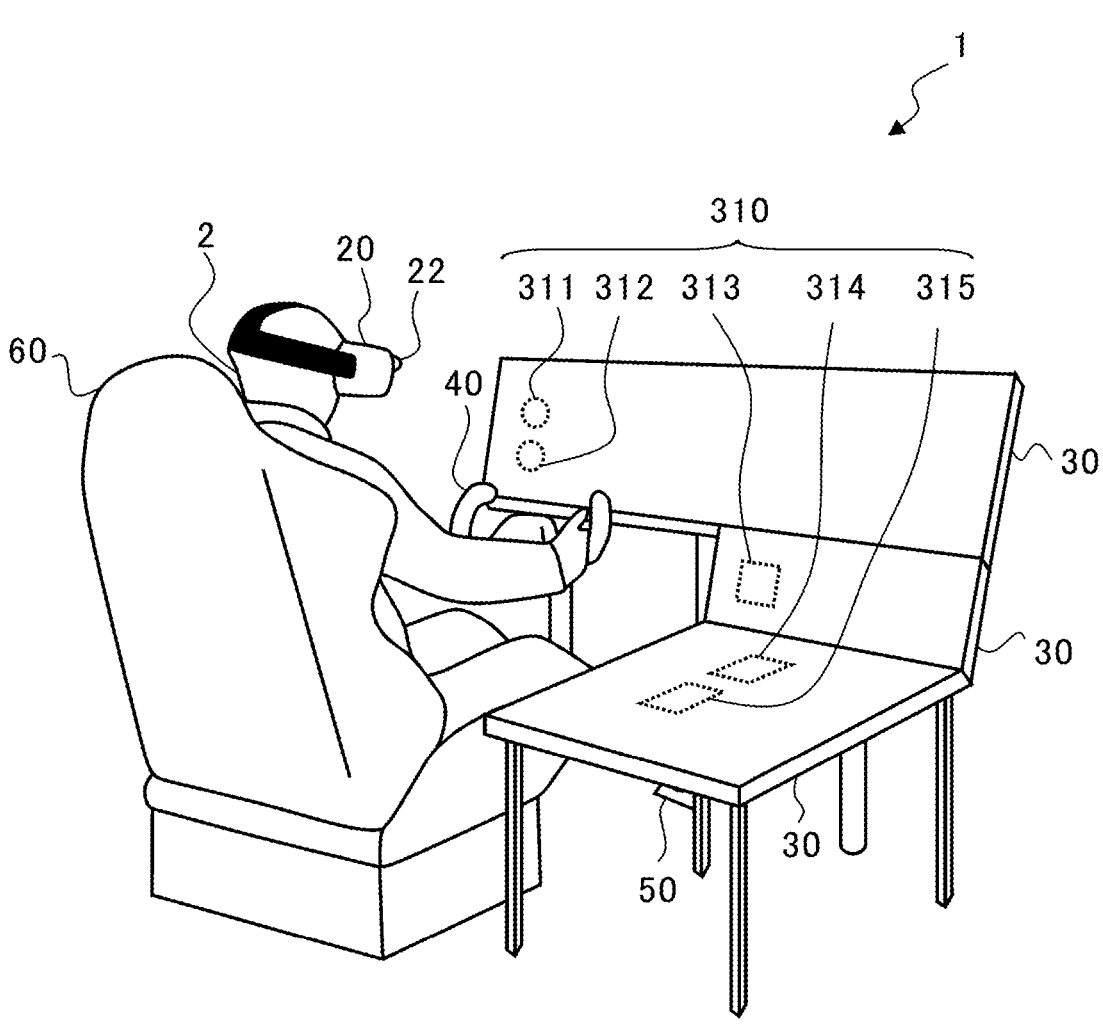
FIG. 2 is a perspective view illustrating an example of a use case of the flight simulation system according to the embodiment.
Figure 3:
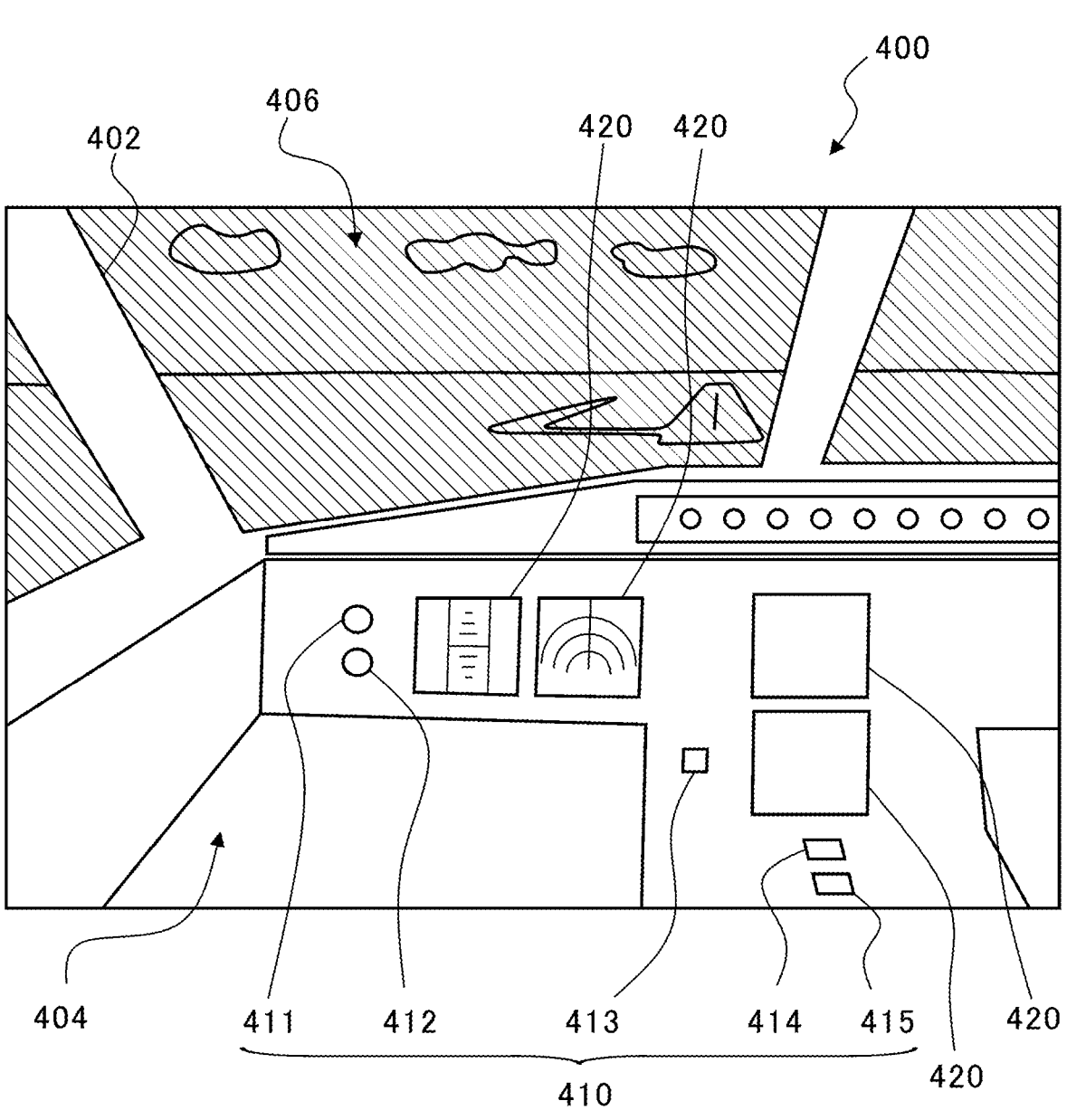
FIG. 3 schematically illustrates an example of a virtual reality image displayed in the flight simulation system according to the embodiment.

FIG. 2 is a perspective view illustrating an example of a use case of the flight simulation system 1 according to the first embodiment. FIG. 3 schematically illustrates an example of a virtual reality image 400 displayed in the flight simulation system 1 according to the first embodiment.

The flight simulation system 1 is configured to perform flight simulation of multiple models of aircrafts. As illustrated in FIGS. 1 and 2, the flight simulation system 1 includes a control device 10, a head-mounted display 20, a haptic device 30, a control yoke 40, rudder pedals 50, and a cockpit seat 60.

The control device 10 may be implemented by, for example, a personal computer, tablet computer, or smartphone. The control device 10 is coupled to the head-mounted display 20, the haptic device 30, the control yoke 40, and the rudder pedals 50 in a wired or wireless manner that enables mutual communications. The control device 10 controls flight simulation using the head-mounted display 20 and the haptic device 30. Flight simulation is to simulate flight situations for the purpose of providing piloting training or on-board experiences of flights with, for example, an aircraft. In the flight simulation according to the present embodiment, for example, while flight situations with a particular aircraft are reproduced in a virtual space, mock flight with an aircraft 402 is carried out in the virtual space based on operations by a user 2 in the real space. The real space is a space in which the flight simulation system 1 is installed in reality. The virtual space is an artificial space on a computer, created by arithmetic operation by, for example, a computer. The control device 10 controls mock flight with the aircraft 402 reproduced in the virtual space based on operations by the user 2 in the real space. The control device 10 includes a processor 12 and a memory 14 that is coupled to the processor 12.

The processor 12 is an arithmetic processing unit installed in a computer. The processor 12 is implemented by, for example, a central processing unit (CPU). The processor 12 may be implemented by another kind of microprocessor. The processor 12 may be implemented by one or multiple processors. The processor 12 runs a program stored in the memory 14 or another storage medium to perform various operations with the control device 10.

The memory 14 is a storage medium for storing programs and other various kinds of data. The memory 14 includes, for example, a random-access memory (RAM) and a read-only memory (ROM). The ROM is a non-volatile memory for storing the program to be run by the processor 12 and, for example, data to be used to run the program. The RAM is a volatile memory for temporarily storing data including variables to be used in operations performed by the processor 12, operational parameters, and operational results. The program stored in the ROM is loaded on the RAM and run by the processor 12 implemented by, for example, a CPU.

The head-mounted display 20 is a display device that is wearable on the head of the user 2. As illustrated in FIG. 2, for example, the head-mounted display 20 is a non-see-through display device that is mountable to block the entire field of vision of the user 2. The head-mounted display 20 is coupled to the control device 10 in a manner that enables communication. The head-mounted display 20 receives information from the control device 10 and displays images of flight simulation for the user 2. The head-mounted display 20 displays, for example, the virtual reality image 400. As illustrated in FIG. 3, the virtual reality image 400 is an image of a cockpit 404 of the aircraft 402 in the virtual space. For example, the virtual reality image 400 includes, for example, images of operational interfaces 411, 412, 413, 414, and 415

(hereinafter also referred to simply as the "operational interfaces 410" in a collective manner) provided inside the cockpit 404 and an image of an instrument panel 420.

The operational interfaces 410 are various kinds of control equipment disposed inside the cockpit 404 of the aircraft 402. The operational interfaces 410 are, for example, various operating tools and devices used for flight control of the aircraft 402, piloting of the aircraft 402, and other kinds of control relating to flight operation of the aircraft 402. The operational interfaces 410 may be, for example, physical operating tools used for piloting of the aircraft 402 such as switches, levers, knobs, and buttons, or a touch panel or other interfaces that virtually display these physical operating tools. Examples of the operational interfaces 410 may include a push-button switch, a toggle switch, a rocker switch, a rotary switch, and a slide switch. The instrument panel 420 is a display device for visually indicating values measured by, for example, various sensors provided in the aircraft 402.

As well as the images of the inside of the cockpit 404, the virtual reality image 400 includes, for example, an image of an external environment 406 (hatched in FIG. 3) outside the aircraft 402, viewed from the cockpit 404. The external environment 406 is the environment outside the aircraft 402 in the virtual space; the external environment 406 is, for example, the view of the sky or ground viewable from the cockpit 404.

Referring back to FIG. 1, the head-mounted display 20 includes an external camera 22 and a posture sensor 24. The external camera 22 is an example of an imager. The external camera 22 is implemented by, for example, a visible light camera. The external camera 22 is not limited to a visible light camera and may be implemented by, for example, a near-infrared camera. The external camera 22 is provided at, for example, the front of the outer side of the head-mounted display 20. The external camera 22 captures images of the surrounding environment around the head-mounted display 20 in the real space. The external camera 22 captures images of the surrounding environment around the cockpit seat 60 of the user 2. For example, the external camera 22 mainly captures images of the environment in front of the user 2.

Examples of the posture sensor 24 include a gyro sensor, an angular velocity sensor, and an acceleration sensor. The posture sensor 24 is provided in the head-mounted display 20. The posture sensor 24 senses various kinds of motion, posture, and orientation of the head of the user 2 wearing the head-mounted display 20. For example, when the user 2 wearing the head-mounted display 20 turns their face to the right, the posture sensor 24 senses this posture and transmits information about the posture to the control device 10.

The haptic device 30 is operable to provide skin sensation feedback for the user 2 with a tactile sensation caused by, for example, vibration, force, movements, heat, or static electricity. The haptic device 30 is formed by, for example, a touch panel shaped as a rectangular plate. One or more haptic devices 30 are disposed around the cockpit seat 60 where the user 2 sits. For example, in the example in FIG. 2, one haptic device 30 is disposed in front of the cockpit seat 60, and two other haptic devices 30 are disposed on the right side with respect to the cockpit seat in total, three haptic devices 30 are provided. This example is, however, not to be interpreted as limiting. Two or fewer haptic devices 30 or four or more haptic devices 30 may be provided. The haptic device 30 may be disposed, for example, at the upper part in front of the cockpit seat 60 or on the left side with respect to the cockpit seat 60. The haptic devices 30 are disposed in the real space at the locations corresponding to the operational interfaces 410 provided in the cockpit 404 in the virtual reality image 400.

For example, as illustrated in FIG. 2, the haptic device 30 is disposed at the location facing the cockpit seat 60 or the location on the right side with respect to the cockpit seat 60. The haptic devices 30 are positioned, for example, such that the distance and direction in the virtual space from the location of the cockpit seat where the user 2 sits to the coordinate locations of the operational interfaces 411, 412, 413, 414, and 415 illustrated in FIG. 3 are the same as the distance and direction in the real space from the location of the cockpit seat 60 where the user 2 sits to operational interface set locations 311, 312, 313, 314, and 315 (hereinafter also referred to simply as the "operational interface set locations 310" in a collective manner) illustrated in FIG. 2. The operational interface set locations 310 are coordinate locations in the real space; the coordinate locations indicate specific locations on the surfaces of the haptic devices 30. The operational interface set locations 310 that are set on the surfaces of the haptic devices 30 respectively correspond to the coordinate locations of the operational interfaces 410 in the virtual space.

The following describes the coordinate location. In the flight simulation system 1 according to the present embodiment, three-dimensional coordinate locations (the virtual space) are set for the individual operational interfaces 410 in the cockpit 404 of the aircraft 402 drawn in the virtual reality image 400. The three-dimensional coordinate locations (the virtual space) may be indicated by XYZ coordinates determined with respect to a first fixed reference location as the origin. The three-dimensional coordinate locations (the virtual space) of the operational interfaces 410 in the virtual reality image 400 are set at the locations corresponding to the three-dimensional coordinate locations (the real space) of the operational interfaces disposed in the cockpit of a real aircraft in the real space. Here, the first fixed reference location may be, for example, a location in the center of the cockpit seat 60 or a location in the center of the cockpit 404 of the aircraft 402.

The operational interface set locations 310 (three-dimensional coordinate locations in the real space) are set on the surfaces of the haptic devices 30 in the real space such that the operational interface set locations 310 respectively correspond to the three-dimensional coordinate locations (the virtual space) of the operational interfaces 410 in the virtual reality image 400. The operational interface set locations 310 (three-dimensional coordinate locations in the real space) may be indicated by XYZ coordinates determined with respect to a second fixed reference location as the origin on the surface of the haptic device 30. The second fixed reference location may be, for example, a location in the center of the surface of the haptic device 30 or a location of any of the four corners of the haptic device 30.

Referring back to FIG. 1, the haptic device 30 includes a touch sensor 32, a vibrator 34, and a liquid crystal display 36. The touch sensor 32 is provided at the surface of the haptic device 30. The touch sensor 32 detects the touch location on the haptic device 30 at which the user 2 touches. For example, when a finger of the user 2 touches the surface of the haptic device 30, the touch sensor 32 detects the touch location and transmits information about the touch location to the control device 10.

One or more vibrators 34 are disposed in the haptic device 30. For example, multiple vibrators 34 may be vertically and horizontally disposed at particular intervals at the surface of the haptic device 30. The vibrator 34 causes vibrations at the touch location detected by the touch sensor 32. For example, when a finger of the user 2 touches the haptic device 30, the vibrator 34 at or near the touch location detected by the touch sensor 32 causes vibrations.

The liquid crystal display 36 is an example of a display. The liquid crystal display 36 is provided at the surface of the haptic device 30. The liquid crystal display 36 receives information transmitted by the control device 10 and displays an image relating to the information.

The control yoke 40 is an operating tool useable by the user 2 to pilot the aircraft 402 in flight simulation. The control yoke 40 is disposed in front of the cockpit seat 60. For example, the control yoke 40 is provided with a handle so that the user 2 holds the control yoke 40 with both hands. The control yoke 40 is coupled to the control device in a manner that enables communication. When the user 2 performs an operation with the control yoke 40, information indicating details of the operation with the control yoke 40 is transmitted to the control device 10, and the control device 10 applies changes based on the details of the operation with the control yoke 40 to flight simulation. When the user 2 pushes or pulls the control yoke 40, the body of the aircraft 402 flying in flight simulation is caused to ascend or descend. When the user 2 turns the control yoke 40, the body of the aircraft 402 flying in flight simulation is caused to turn. In the above description, the operating tool for piloting the aircraft 402 is a control yoke, but this is not to be interpreted as limiting; the operating tool for piloting the aircraft 402 may be a control stick.

The rudder pedals 50 are operating tools useable by the user 2 to pilot the aircraft 402 in flight simulation. The rudder pedals 50 are disposed at the lower part in front of the cockpit seat 60. For example, the rudder pedals 50 are provided with pedals in the manner in which the user 2 can push down the rudder pedals 50 with their feet. The rudder pedals 50 are coupled to the control device 10 in a manner that enables communication. When the user 2 performs an operation with the rudder pedals 50, information indicating details of the operation with the rudder pedals 50 is transmitted to the control device 10, and the control device 10 applies changes based on the details of the operation with the rudder pedals 50 to flight simulation. When the user 2 pushes down the rudder pedals 50, the nose of the aircraft 402 flying in flight simulation is caused to turn in a different direction.

The cockpit seat 60 is a seat where the user 2 sits during flight simulation. The cockpit seat 60 may be, for example, a seat especially for flight simulation or a seat for general purposes. The cockpit seat 60 is disposed near the haptic device 30, the control yoke 40, and the rudder pedals 50, facing the haptic device 30, the control yoke 40, and the rudder pedals 50. As a result, the user 2 sitting in the cockpit seat 60 can operate with their own hands and feet the haptic device 30, the control yoke 40, and the rudder pedals 50.

Figure 4:
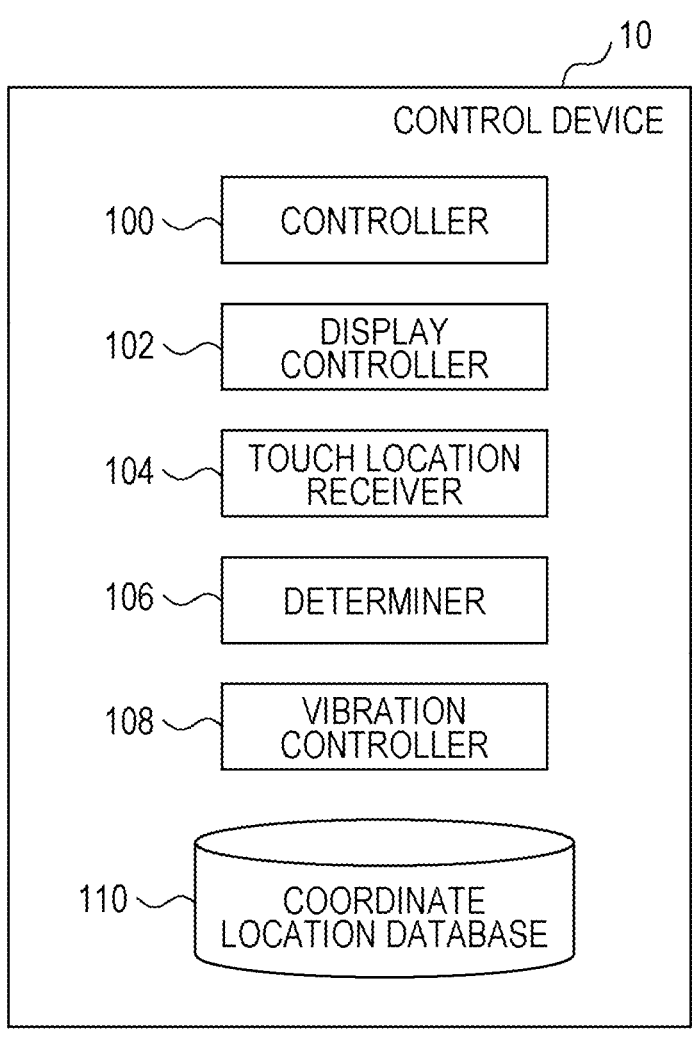
FIG. 4 is a block diagram illustrating an example of the functional configuration of the flight simulation system according to the embodiment.

2. Functional Configuration of Flight Simulation System According to First Embodiment Next, the functional configuration of the flight simulation system 1 according to the first embodiment will be described with reference to FIG. 4. FIG. 4 is a block diagram illustrating an example of the functional configuration of the flight simulation system 1 according to the first embodiment.

As illustrated in FIG. 4, the control device 10 includes a controller 100, a display controller 102, a touch location receiver 104, a determiner 106, a vibration controller 108, and a coordinate location database 110.

The coordinate location database 110 is previously stored in the memory 14. In the coordinate location database 110, first coordinate data, second coordinate data, identification information of the operational interface 410 are associated with each other. The processor 12 searches the coordinate location database 110 using any one information item out of the first coordinate data, the second coordinate data, and the identification information of the operational interface 410, so that the processor 12 uniquely extracts other information items associated with the one information item. The coordinate location database 110 has a table in which the first coordinate data, the second coordinate data, and the identification information of the operational interface 410 are associated with each other for individual aircraft models.

The first coordinate data is coordinate data about individual aircraft models, indicating the coordinate locations (the virtual space) of the operational interfaces 410 provided in the cockpit 404 of the aircraft 402 in the virtual space with respect to each aircraft model. For example, the first coordinate data according to the present embodiment indicates the individual coordinate locations of the operational interfaces 410 included in the virtual reality image 400 illustrated in FIG. 3.

The second coordinate data is coordinate data indicating the coordinate locations (the real space) on the surface of the haptic device 30 in the real space, corresponding to the coordinate locations (the virtual space) of the operational interfaces 410. For example, the second coordinate data according to the present embodiment indicates the coordinate locations (the real space) of the operational interface set locations 310 on the surface of the haptic device 30 illustrated in FIG. 2. The operational interface set locations 311, 312, 313, 314, and 315 (the real space) in the real space respectively correspond to the coordinate locations (the virtual space) of the operational interfaces 411, 412, 413, 414, and 415 in the virtual reality image 400.

The identification information of the operational interface 410 is identification information for identifying the individual operational interfaces 410. The identification information of the operational interface 410 may be an identification number or identification code generated for the individual operational interfaces 410. Because the kinds and numbers of operational interfaces 410 provided in the cockpit 404 vary among different aircraft models, the identification information of the operational interface 410 is set differently for individual aircraft models. With this identification information, the individual operational interfaces 410 provided in the cockpit 404 of the aircraft 402 of each model are uniquely identified.

The controller 100 controls flight simulation. For example, the controller 100 performs flight simulation of one model selected by the user 2 from multiple models. For example, the controller 100 reproduces in the virtual space a mock flight of the aircraft 402 of one model selected by the user 2 and controls the mock flight. For example, in response to operations performed by the user 2 with the haptic device 30, the control yoke 40, the rudder pedals 50, and other elements, the controller 100 applies changes based on details of the operations to the flight in the ongoing flight simulation. The controller 100 also controls, for example, outside environments other than the aircraft 402 in the virtual space. The outside environments are environmental conditions that can affect flight with the aircraft 402, such as weather, temperature, and wind speed.

The display controller 102 causes the head-mounted display 20 to display images relating to flight simulation. For example, the display controller 102 causes the head-mounted display 20 to display the virtual reality image 400 illustrated in FIG. 2. The display controller 102 causes the head-mounted display 20 to display, for example, the virtual reality image 400 picturing the operational interfaces 410 provided in the cockpit 404 of the model selected by the user 2.

The display controller 102 also changes the displayed appearance of the cockpit 404 in the virtual reality image 400 based on, for example, the detection result from the posture sensor 24. The display controller 102 changes the displayed appearance of the cockpit 404 in the virtual reality image 400 displayed on the head-mounted display 20, for example, in association with various kinds of motion, posture, and orientation of the head of the user 2 wearing the head-mounted display 20. For example, when the user 2 wearing the head-mounted display 20 sits in the cockpit seat and faces forward, the display controller 102 causes the head-mounted display 20 to display the virtual reality image 400 picturing the area viewed on the front side with respect to the cockpit seat, out of the areas of the cockpit 404 in the virtual space. When the user 2 wearing the head-mounted display 20 sits in the cockpit seat 60 and faces rightward, the display controller 102 causes the head-mounted display 20 to display the virtual reality image 400 picturing the area viewed on the right side with respect to the cockpit seat, out of the areas of the cockpit 404 in the virtual space. When the user 2 faces leftward, backward, upward, or downward, similarly to/in a similar manner/in the same manner as/as in/likewise, the virtual reality image 400 picturing the area viewed on the left side, back side, upper side, or lower side with respect to the cockpit seat is displayed out of the areas of the cockpit 404. As described above, the display controller 102 is operable to provide control to display the virtual reality image 400 in all 360-degree directions of the cockpit 404 of the aircraft 402 in the virtual space, for example, in association with various kinds of motion, posture, and orientation of the head of the user 2 sensed by the posture sensor 24. This improves the immersive feeling of the user 2 in flight simulation.

The touch location receiver 104 obtains the second coordinate data from the touch sensor 32. For example, when a finger of the user 2 touches the operational interface set location 310 on the surface of the haptic device 30, the touch location receiver 104 obtains the second coordinate data of the operational interface set location 310 corresponding to the touch location from the touch sensor 32. For example, when a finger of the user 2 touches the particular operational interface set location 311 on the surface of the haptic device 30, the touch sensor 32 detects the coordinate location of the operational interface set location 311 as the touch location and transmits the second coordinate data of the operational interface set location 311 to the control device 10. The touch location receiver 104 obtains the second coordinate data of the operational interface set location 311 transmitted by the touch sensor 32. By receiving this second coordinate data, a particular operational interface 410 is identified as the operational interface 410 operated by the user 2 in flight simulation.

The determiner 106 determines whether a finger of the user 2 has touched the haptic devices 30 based on, for example, the detection result on the haptic devices 30 from the touch sensor 32. For example, the determiner 106 determines whether a finger of the user 2 has touched any of the operational interface set locations 310 configured on the surface of the haptic device 30. For example, when a finger of the user 2 touches the particular operational interface set location 311 on the surface of the haptic device 30, the touch sensor 32 detects the coordinate location of the operational interface set location 311 as the touch location and transmits the second coordinate data of the operational interface set location 311 to the control device 10. When the second coordinate data of the operational interface set location 311 is transmitted from the touch sensor 32, the determiner 106 determines that a finger of the user 2 has touched the operational interface set location 311.

The determiner 106 also identifies, based on the coordinate location database 110 and a touch location (the operational interface set location 310), the operational interface 410 corresponding to the touch location and the coordinate location of the operational interfaces 410. For example, using the second coordinate data corresponding to the touch location obtained by the touch location receiver 104, the determiner 106 searches the coordinate location database 110 of one particular model selected by the user 2, detects the identification information and first coordinate data of a particular operational interface 410 associated with the second coordinate data. In this manner, the determiner 106 identifies the particular operational interface 410 and the coordinate location of the particular operational interface 410. Here, a particular operational interface 410 is one operational interface 410 corresponding to the touch location (the operational interface set location 310) out of the operational interfaces 410 disposed in the cockpit 404 of a particular model selected by the user 2.

For example, when the user 2 touches the operational interface set location 311 on the haptic device 30 illustrated in FIG. 2, the determiner 106 identifies, as the operational interface 410 corresponding to the touch location, the operational interface 411 in the virtual reality image 400 illustrated in FIG. 3 and the coordinate location of the operational interface 411. For example, when the user 2 touches the operational interface set location 311, the touch location receiver 104 obtains the second coordinate data of the operational interface set location 311 that is the touch location in the real space. The determiner 106 then searches the coordinate location database 110 using the second coordinate data and obtains the identification information and first coordinate data of the operational interface 411 associated with the second coordinate data. Based on the identification information and first coordinate data of the operational interface 411, the determiner 106 identifies the operational interface 411 and the coordinate location of the operational interface 411.

For example, the determiner 106 may also search the coordinate location database 110 using the second coordinate data obtained by the touch location receiver 104 and determines whether the identification information and first coordinate data of the operational interface 410 corresponding to the second coordinate data are registered in the coordinate location database 110. As a result, when the first coordinate data is not registered, it is determined that the touch on the haptic device 30 by the user 2 is not on the operational interfaces 410.

The vibration controller 108 controls vibration of the vibrator 34. When the user 2 touches the surface of the haptic device 30, the vibration controller 108 causes the vibrator 34 to cause vibrations at the touch location on the surface of the haptic device 30. For example, when one operational interface 410 corresponding to the touch location touched by the user 2 on the haptic device 30 is identified, the vibration controller 108 causes the vibrator 34 to cause vibrations at the touch location.

When the user 2 touches the haptic device 30, the vibration controller 108 may change the vibration mode of the vibrator 34 depending on the kind of the one operational interface 410 identified in the virtual space based on the touch location. For example, when the one operational interface 410 identified based on the touch location is a push-button switch, the vibration controller 108 causes the vibrator 34 to cause vibrations at the following two time points: when the button is pressed down, and when the button is released. When the one operational interface 410 identified based on the touch location is a toggle switch, the vibration controller 108 causes the vibrator 34 to cause a vibration once when the toggle switch is flicked.

3. Process Flow of Flight Simulation System According to First Embodiment

Figure 5:
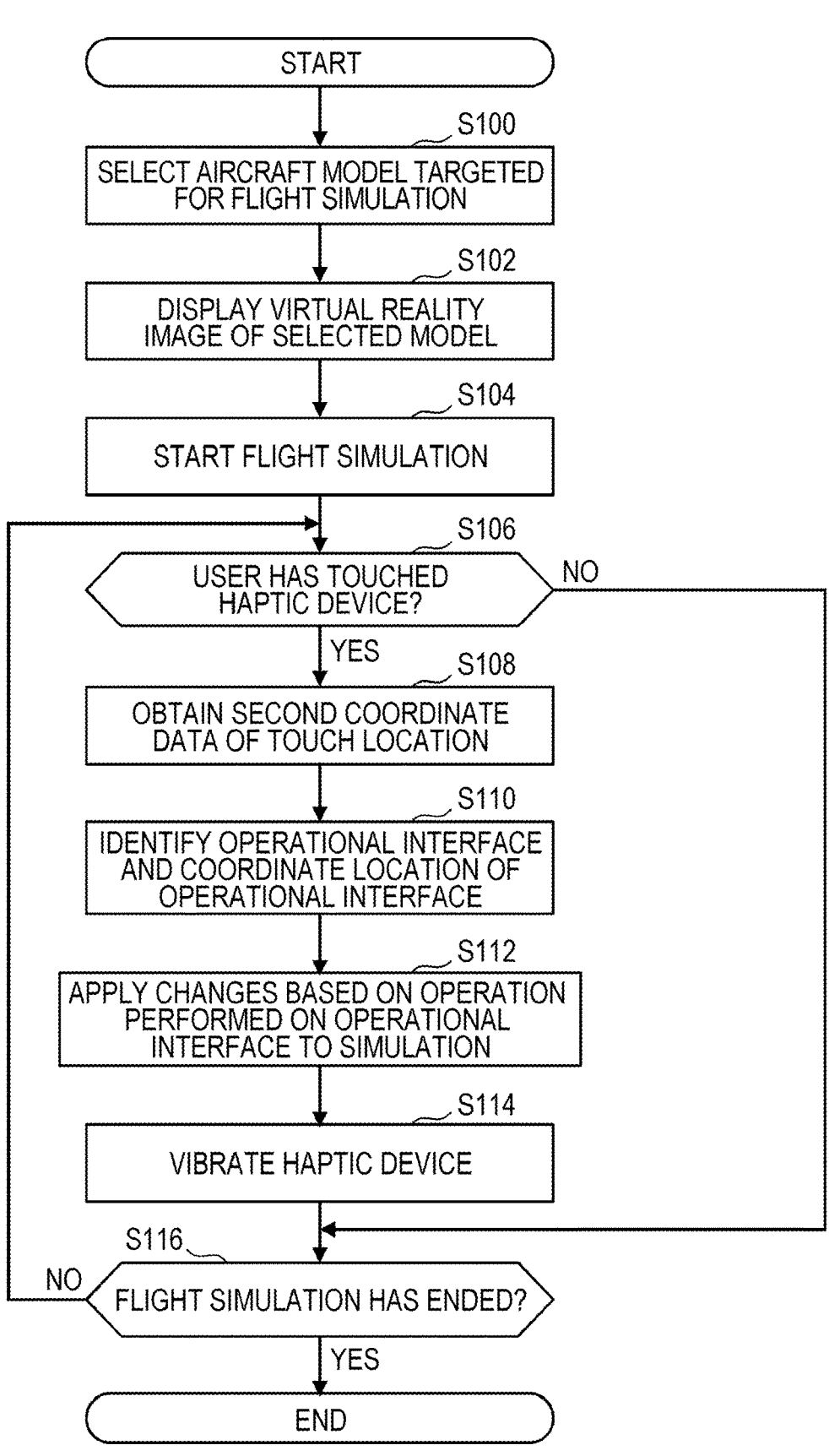
FIG. 5 is a flowchart illustrating a flight simulation control process performed by a control device according to the embodiment.

Next, the process flow implemented by the control device 10 of the flight simulation system 1 according to the first embodiment will be described with reference to FIG. 5. FIG. 5 is a flowchart illustrating a flight simulation control process performed by the control device 10 according to the first embodiment.

As illustrated in FIG. 5, the user 2 selects an aircraft model targeted for flight simulation from multiple models (step S100). The controller 100 designates the model selected by the user 2 as the model with which flight simulation is to be performed.

Next, the display controller 102 obtains from the memory 14 the virtual reality image 400 picturing the operational interfaces 410 provided in the cockpit 404 of the model selected by the user 2. The display controller 102 then causes the head-mounted display 20 to display the obtained virtual reality image 400 (step S102).

Subsequently, the controller 100 starts flight simulation of the selected model (step S104). During this flight simulation, the controller 100 and the display controller 102 change the appearance of the virtual reality image 400 displayed on the head-mounted display 20 based on simulation contents and details of operations performed by the user 2.

After flight simulation is started, the determiner 106 determines whether the user 2 has touched the operational interface set locations 310 on the surface of the haptic devices 30 (step S106).

As a result, when it is determined that the user 2 has not touched the haptic devices 30 (NO in step S106), the process proceeds to step S116. By contrast, when it is determined that the user 2 has touched the haptic devices 30 (YES in step S106), the touch location receiver 104 obtains the second coordinate data of the operational interface set location 310 corresponding to the touch location from the touch sensor 32 (step S108). For example, when the touch location touched by the user 2 is the operational interface set location 311, the touch location receiver 104 obtains the second coordinate data of the operational interface set location 311 as the touch location from the touch sensor 32.

Subsequently, based on the second coordinate data of the operational interface set location 310 corresponding to the touch location obtained in step S108 and the coordinate location database 110, the determiner 106 identifies the operational interface 410 corresponding to the touch location and the coordinate location of the operational interface 410 (step S110).

Subsequently, the controller 100 applies changes based on the operation performed on the identified operational interface 410 to flight simulation of the selected model (step S112).

For example, when the touch location touched by the user 2 is the operational interface set location 310, the controller 100 determines that the operational interface 410 corresponding to the operational interface set location 310 is operated and applies changes based on details of the operation performed on the operational interface 410 to the flight in the ongoing flight simulation. For example, in the case where the operational interface 411 is a switch for performing a particular operation with the aircraft 402, when the user 2 touches the operational interface set location 311 in the real space, the controller 100 determines that the operational interface 411 is operated and applies changes corresponding to the particular operation to the flight in the ongoing flight simulation. For example, in the case where the operational interface 411 in the virtual space is a switch relating to an engine starter, and the operational interface 411 is in OFF state, when the user 2 touches the operational interface set location 311 in the real space, the controller 100 changes the operational interface 411 from OFF state to ON state. The controller 100 then determines that the operational interface 411 is turned on and applies changes to the flight in flight simulation so that the engine of the aircraft 402 in the virtual space is started. The display controller 102 also applies changes based on the operation performed on the identified operational interface 410 to the virtual reality image 400 and causes the head-mounted display 20 to display the virtual reality image 400. For example, in the case where the operational interface 411 in the virtual space is in OFF state, when the user 2 touches the operational interface set location 311 in the real space, the display controller 102 causes the head-mounted display 20 to display the virtual reality image 400 in which the operational interface 411 in the virtual space has been changed from OFF state to ON state.

Subsequently, the vibration controller 108 causes vibrations at the touch location on the haptic device 30 in a vibration mode of the vibrator 34 corresponding to the kind of the identified operational interface 410 (step S114).

When in step S106 it is determined that the user 2 has not touched the haptic device 30 (NO in step S106) or when the haptic device 30 is vibrated in step S114, the controller 100 determines whether flight simulation has ended (step S116). As a result, when it is determined that flight simulation has not ended (NO in step S116), the process is repeated from step S106 and flight simulation continues. By contrast, when it is determined that flight simulation has ended (YES in step S116), the flight simulation control process ends.

As described above, in the flight simulation system 1 according to the first embodiment, regarding multiple models of the aircraft 402, the first coordinate data indicating the coordinate locations of the operational interfaces 410 provided in the cockpit 404 of the aircraft 402 of each model in the virtual space is previously stored. While flight simulation of the model selected by the user 2 is performed, when the user 2 touches the haptic device 30, the control device 10 identifies the operational interface 410 operated by the user 2, based on the coordinate location database 110, in which the first coordinate data and the second coordinate data are previously associated with each other, and the second coordinate data indicating the actual touch location. As a result, although the arrangement of the operational interfaces 410 varies among different models, the flight simulation system 1 can perform flight simulation of the different models because the flight simulation system 1 reproduces the operational interfaces 410 of the different models in a virtual manner using the same haptic devices 30. For the purpose of performing flight simulation of one model selected from multiple models, hardware corresponding to the model is not to be prepared. As such, a flight simulation system with low costs and high general applicability is provided.

With the flight simulation system 1 according to the first embodiment, when the user 2 touches the surface of the haptic device 30, the vibration controller 108 causes vibrations at the touch location with the vibrator 34. As a result, when the user 2 performs an operation on the operational interface 410 displayed in the virtual reality image 400, the user 2 is notified by vibration that an operation is performed on the operational interface 410. As such, the user 2 can perform operations on the operational interfaces 410 in the virtual space in an assured manner.

With the flight simulation system 1 according to the first embodiment, when the user 2 touches the haptic device the vibration controller 108 changes the vibration mode of the vibrator 34 depending on the kind of the one operational interface 410 identified in the virtual space based on the touch location. As a result, based on the vibration mode, the user 2 can easily identify the operational interface 410 in the virtual space that is operated. This improves the usability of the haptic devices in flight simulation and the reality of the operational interfaces 410.

4. Functional Configuration of Flight Simulation System According to Second Embodiment Next, the flight simulation system 1 according to a second embodiment of the disclosure will be described in detail with reference to FIGS. 6 and 7. The second embodiment is a modification of the first embodiment. The following mainly describes the points different from the first embodiment, and detailed descriptions of the same configurations, functions, and other details as the first embodiment are not repeated.

In the flight simulation system 1 according to the first embodiment, the operational interface 410 in the virtual space and the coordinate location of the operational interface 410 are identified based on the coordinate location database 110 stored in the memory 14 and the touch location touched by the user 2 on the haptic device 30. However, in the flight simulation system 1 according to the first embodiment, the haptic devices 30 are to be disposed at proper coordinate locations (the real space) corresponding to the coordinate locations (the virtual space) of the operational interfaces 410.

If the haptic devices 30 are disposed apart from the proper locations (the real space), the operational interface set locations 310 on the haptic devices 30 in the real space are not coincident with the coordinate locations of the operational interfaces 410 indicated by the first coordinate data stored in the coordinate location database 110.

In the flight simulation system 1 according to the second embodiment, two-dimensional bar codes 511, 512, 513, 514, and 515 (hereinafter also referred to simply as the "two-dimensional bar codes 510" in a collective manner) indicating the operational interface set locations 310 are displayed on the liquid crystal displays 36 of the haptic devices 30 (see FIG. 7), and the two-dimensional bar codes 510 are captured with the external camera 22 of the head-mounted display 20. With this configuration, in the flight simulation system 1 according to the second embodiment, it is possible to correct the coordinate locations of the operational interfaces 410 in the virtual space based on the displayed locations (in other words, the operational interface set locations 310) at which the two-dimensional bar codes 510 are displayed on the liquid crystal displays 36 in the real space. As a result, the coordinate locations of the operational interfaces 410 in the virtual space are made coincident with the displayed locations of the two-dimensional bar codes 510 in an exact manner.

Figure 6:
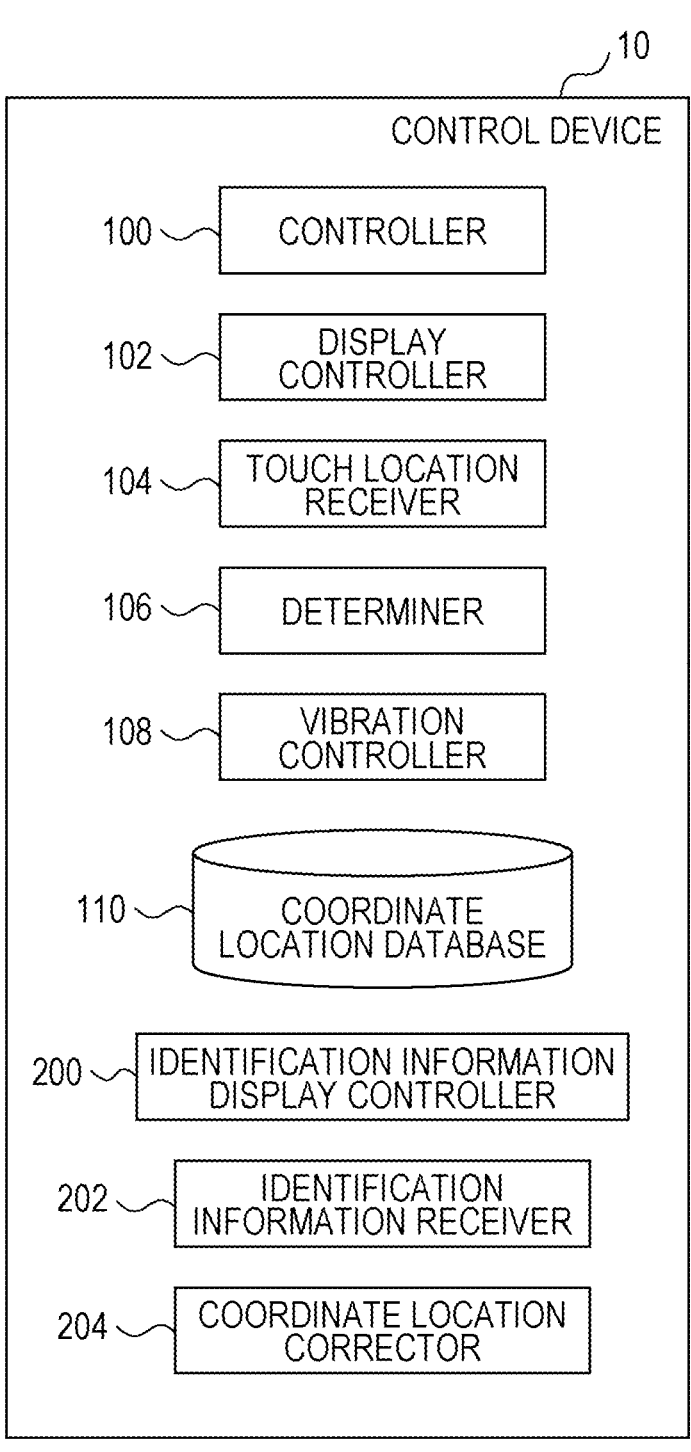
FIG. 6 is a block diagram illustrating an example of the functional configuration of a flight simulation system according to an embodiment.
Figure 7:
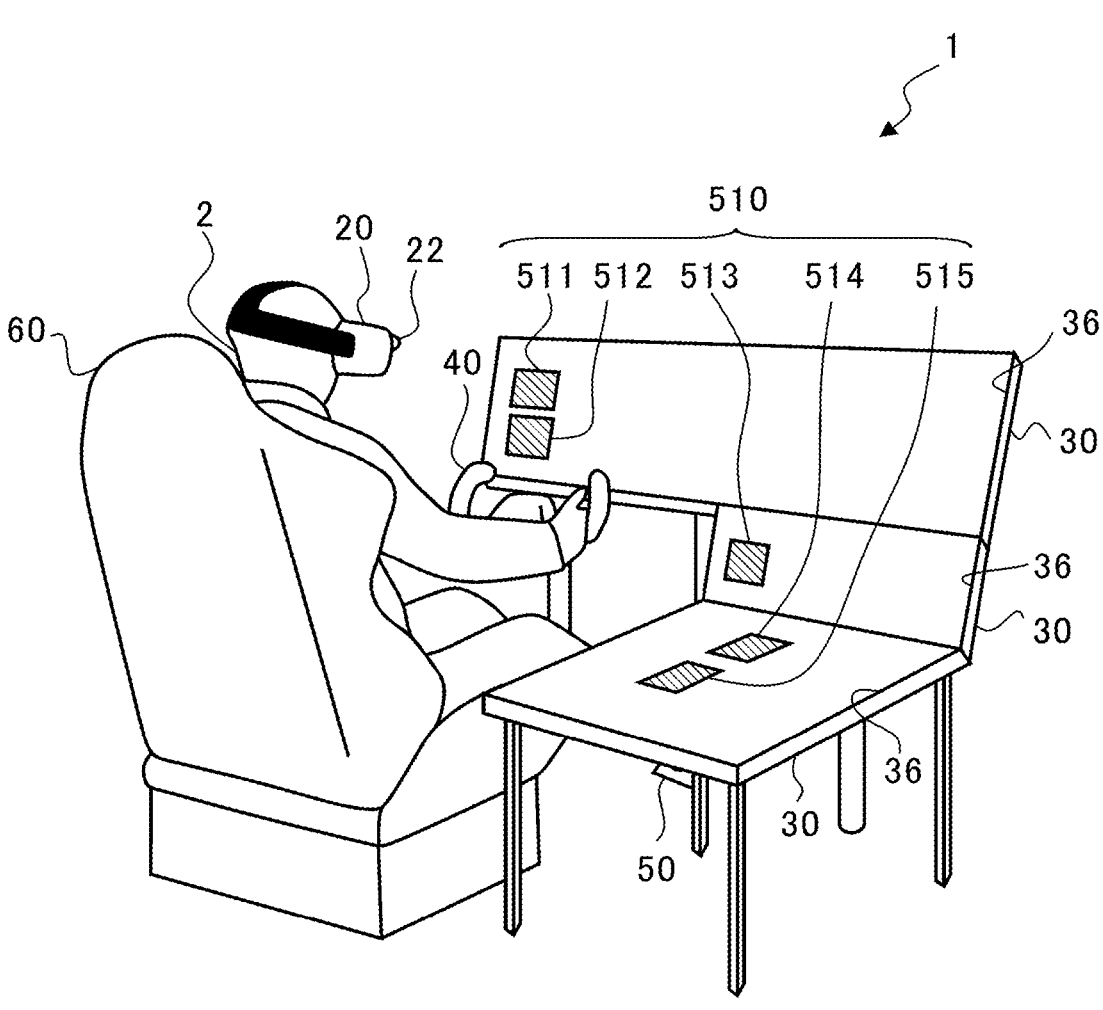
FIG. 7 is a perspective view illustrating an example of a use case of the flight simulation system according to the embodiment.

FIG. 6 is a block diagram illustrating an example of the functional configuration of the flight simulation system 1 according to the second embodiment. FIG. 7 is a perspective view illustrating an example of a use case of the flight simulation system 1 according to the second embodiment may be used. As illustrated in FIG. 6, the control device 10 of the flight simulation system 1 according to the second embodiment includes, in addition to the controller 100, the display controller 102, the touch location receiver 104, the determiner 106, the vibration controller 108, and the coordinate location database 110 that are the constituent elements of the control device 10 of the flight simulation system 1 according to the first embodiment, an identification information display controller 200, an identification information receiver 202, and a coordinate location corrector 204.

The identification information display controller 200 causes the liquid crystal displays 36 of the haptic devices to display one or more two-dimensional bar codes 510. The two-dimensional bar code 510 is an example of identification information. The two-dimensional bar code 510 is identification information generated for the individual operational interfaces 410 in the virtual space so that the operational interfaces 410 are uniquely identified. The two-dimensional bar code 510 of the operational interface 410 is not necessarily a two-dimensional bar code as an example. The two-dimensional bar code 510 may be alternatively implemented as a quick response (QR) code (registered trademark), a one-dimensional bar code, text information such as identification information or identification code of the operational interface 410, or various kinds of patterns; otherwise, the two-dimensional bar code 510 may be implemented as any kind of information such as illumination modes of an infrared lamp when the information is created in the manner that enables identification of the operational interface 410.

The identification information display controller 200, for example, refers to the coordinate location database 110 previously stored in the memory 14 and identifies a coordinate location on the surface of the haptic device 30 in the real space and a two-dimensional bar code 510 that correspond to a particular operational interface 410 of the operational interfaces 410 in the virtual space. The identification information display controller 200 then causes the haptic device 30 to display the two-dimensional bar code 510 corresponding to the particular operational interface 410 at the coordinate location on the haptic device 30. For example, as illustrated in FIG. 7, the identification information display controller 200 causes the liquid crystal displays 36 to display the two-dimensional bar codes 511, 512, 513, 514, and 515. The two-dimensional bar codes 511, 512, 513, 514, and 515 are identification information corresponding to the respective operational interfaces 411, 412, 413, 414, and 415 in the virtual reality image 400 illustrated in FIG. 3. For example, the identification information display controller 200 searches the coordinate location database 110 using the first coordinate data of the operational interface 411 in the virtual reality image 400 illustrated in FIG. 3 and extracts the second coordinate data corresponding to the first coordinate data. The identification information display controller 200 then causes the haptic device 30 in the real space to display the two-dimensional bar code 511 at the coordinate location on the surface of the haptic device 30 corresponding to the second coordinate data as illustrated in FIG. 7.

In the coordinate location database 110 according to the present embodiment, as well as the first coordinate data, the second coordinate data, and the identification information of the operational interface 410, the two-dimensional bar code 510 is also stored in an associated manner.

The identification information receiver 202 obtains, for example, the two-dimensional bar code 510 captured by the external camera 22 and an image capture location at which the two-dimensional bar code 510 is captured. The identification information receiver 202 obtains, for example, as the image capture location, the distance and direction from the location of the cockpit seat 60 in which the user 2 sits to the captured two-dimensional bar code 510.

The coordinate location corrector 204 corrects the coordinate location of the operational interface 410 in the virtual space. The coordinate location corrector 204 determines, for example, whether the image capture location of the two-dimensional bar code 510 obtained by the identification information receiver 202 is coincident with the coordinate location of the operational interface 410 in the virtual space corresponding to the two-dimensional bar code 510. For example, the coordinate location corrector 204 determines whether the distance and direction in the real space from the location of the cockpit seat 60 in which the user 2 sits to the captured two-dimensional bar code 510 are the same as the distance and direction in the virtual space from the location of the cockpit seat in which the user 2 sits to the coordinate location of the operational interface 410 corresponding to the two-dimensional bar code 510.

For example, when the image capture location of the two-dimensional bar code 510 is not coincident with the coordinate location of the operational interface 410 in the virtual space, the coordinate location corrector 204 corrects the coordinate location of the operational interface 410 in the virtual space. For example, based on the image capture location of the two-dimensional bar code 510 captured by the external camera 22, the coordinate location corrector 204 corrects the coordinate location of the operational interface 410 in the virtual space corresponding to the two-dimensional bar code 510. For example, the coordinate location corrector 204 converts the distance and direction from the location of the cockpit seat in which the user 2 sits to the captured two-dimensional bar code 510 into the distance and direction in the virtual space; the coordinate location corrector 204 then corrects the coordinate location of the operational interface 410 in the virtual space by designating the coordinate location of the same distance and direction in the virtual space from the location of the cockpit seat in which the user 2 sits as a new coordinate location of the operational interface 410 corresponding to the two-dimensional bar code 510.

The display controller 102 provides display of the images picturing the operational interfaces 410 in the virtual space in the manner in which the images picturing the operational interfaces 410 are superimposed on the virtual reality image 400. The virtual reality image 400 is displayed with the image picturing the external environment 406, the image picturing the cockpit 404, the image picturing the instrument panel 420, and the images picturing the operational interfaces 410 that are superimposed in the order presented. The display controller 102 provides display of the images picturing the operational interfaces 410 corresponding to the two-dimensional bar codes 510 captured by the external camera 22 in the manner in which the images picturing the operational interfaces 410 are superimposed on the virtual reality image 400 displayed on the head-mounted display 20. For example, when the coordinate location of the operational interface 410 in the virtual space is corrected by the coordinate location corrector 204, the display controller 102 changes the image picturing the operational interface 410 from the coordinate location before correction to a new coordinate location after correction and then provides display of the image picturing the operational interface 410 in the manner in which the image picturing the operational interface 410 is superimposed on the virtual reality image 400.

5. Process Flow of Flight Simulation System According to Second Embodiment

Figure 8:
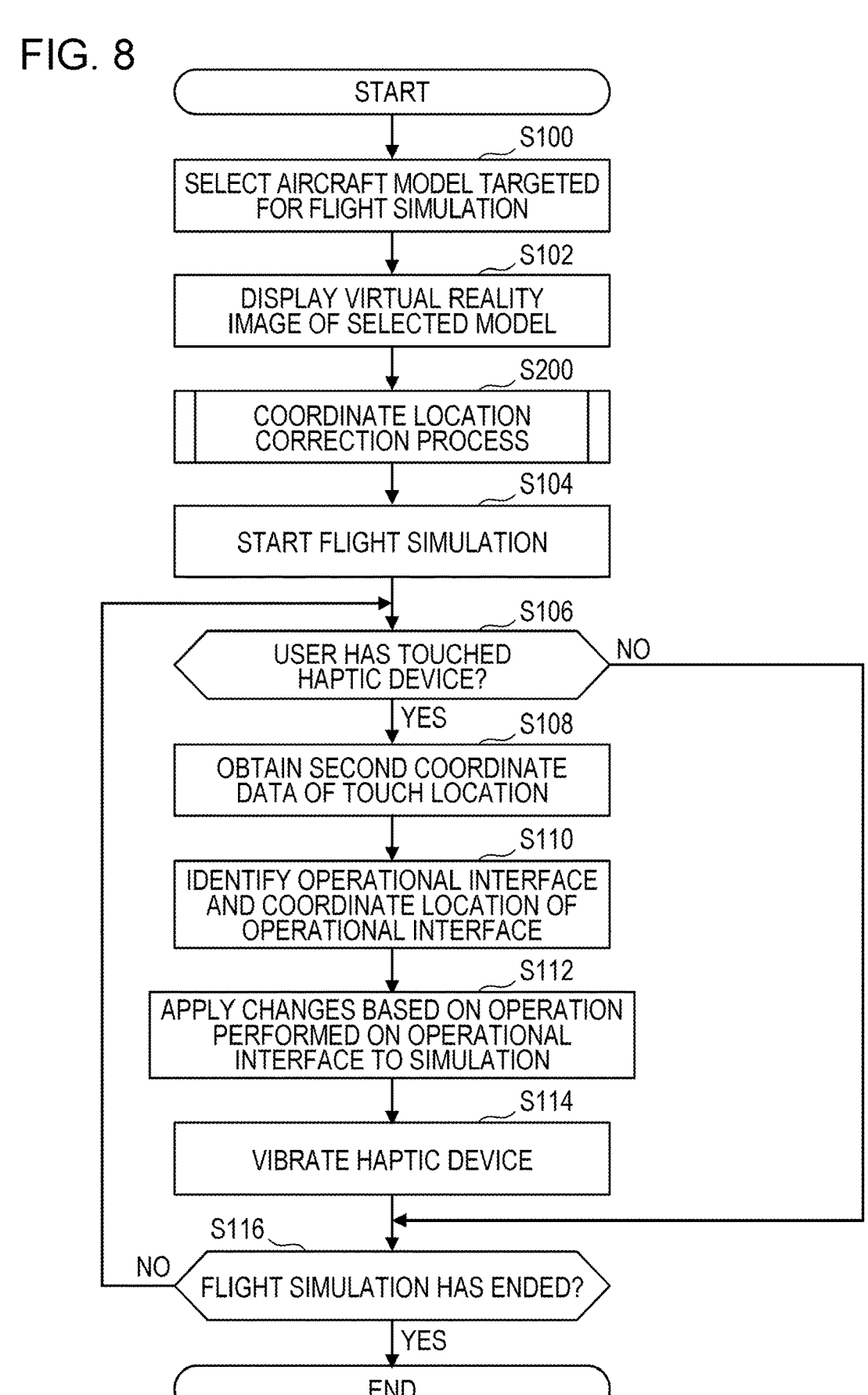
FIG. 8 is a flowchart illustrating a flight simulation control process performed by a control device according to the embodiment.

Next, the process flow implemented by the control device 10 of the flight simulation system 1 according to the second embodiment will be described with reference to FIGS. 8 and 9. FIG. 8 is a flowchart illustrating a flight simulation control process performed by the control device according to the second embodiment. Except for step S200, the process illustrated in FIG. 8 is the same as the flight simulation control process performed by the control device 10 according to the first embodiment illustrated in FIG. 5, and descriptions of the steps other than step S200 are not repeated.

As illustrated in FIG. 8, after the virtual reality image 400 is displayed on the head-mounted display 20 in step S102, the control device 10 performs a coordinate location correction process in FIG. 9 (step S200).

In step S200, the control device 10 causes the liquid crystal displays 36 of the haptic devices 30 to display the two-dimensional bar codes 510. The external camera 22 captures the two-dimensional bar codes 510, and the control device 10 obtains the image capture locations of the two-dimensional bar codes 510 from the external camera 22. The control device 10 subsequently determines whether the image capture locations of the two-dimensional bar code 510 are coincident with the coordinate locations of the operational interfaces 410 corresponding to the two-dimensional bar codes 510. As a result, when the image capture locations of the two-dimensional bar codes 510 are not coincident with the coordinate locations of the operational interfaces 410 corresponding to the two-dimensional bar codes 510, the control device 10 corrects the coordinate locations of the operational interfaces 410 corresponding to the two-dimensional bar codes 510. Based on the corrected coordinate locations, the control device 10 causes the head-mounted display 20 to display the operational interfaces 410.

Subsequently, the process proceeds to step S104 illustrated in FIG. 8. The operations from step S104 to step S116 illustrated in FIG. 8 are the same as the operations from step S104 to step S116 of the flight simulation control process performed by the control device 10 according to the first embodiment illustrated in FIG. 5, and descriptions of the operations are not repeated.

The following describes in detail the coordinate location correction process (step S200) in FIG. 8 with reference to FIG. 9. FIG. 9 is a flowchart illustrating the coordinate location correction process (step S200) performed by the control device 10 according to the second embodiment.

As illustrated in FIG. 9, the identification information display controller 200 causes the liquid crystal displays 36 of the haptic devices 30 to display all the two-dimensional bar codes 510 representing the operational interfaces 410 provided in the cockpit 404 of one aircraft model selected by the user 2 (step S202). The liquid crystal displays 36 of the haptic devices 30 receive information from the identification information display controller 200 and display the two-dimensional bar codes 510 of the operational interfaces 410 at the locations in the real space corresponding to the operational interfaces 410.

Subsequently, the external camera 22 of the head-mounted display 20 detects the two-dimensional bar codes 510 displayed on the liquid crystal displays 36 of the haptic devices 30. Next, the identification information receiver 202 obtains the detected two-dimensional bar codes 510 and the image capture locations of the two-dimensional bar codes 510 from the external camera 22 (step S204).

Subsequently, the coordinate location corrector 204 determines whether the image capture locations of the two-dimensional bar codes 510 obtained by the identification information receiver 202 are coincident with the coordinate locations of the operational interfaces 410 in the virtual space corresponding to the two-dimensional bar codes 510 (step S206).

As a result, when it is determined that the image capture locations of the two-dimensional bar codes 510 are coincident with the coordinate locations of the operational interfaces 410 (YES in step S206), the coordinate location correction process ends. By contrast, when it is determined that the image capture locations of the two-dimensional bar codes 510 are not coincident with the coordinate locations of the operational interfaces 410 (NO in step S206), the coordinate location corrector 204 corrects the coordinate locations of the operational interfaces 410 in the virtual space corresponding to the two-dimensional bar codes 510 based on the image capture locations of the two-dimensional bar codes 510 obtained by the identification information receiver 202 (step S208).

Subsequently, the display controller 102 changes the images picturing the operational interfaces 410 in the virtual space corresponding to the two-dimensional bar codes 510 from the coordinate locations before correction to new coordinate locations after correction and causes the head-mounted display 20 to display the images (step S210), and the coordinate location correction process ends. The display controller 102 provides display of the images picturing the operational interfaces 410 corresponding to the two-dimensional bar codes 510 at the coordinate locations after correction in the manner in which the images picturing the operational interfaces 410 are superimposed on the virtual reality image 400 displayed on the head-mounted display 20.

As described above, in the flight simulation system 1 according to the second embodiment, the two-dimensional bar codes 510 are displayed on the liquid crystal displays 36, and the external camera 22 captures the two-dimensional bar codes 510. As a result, based on the image capture locations of the two-dimensional bar codes 510, the coordinate location corrector 204 corrects the coordinate location of the operational interface 410 in the virtual space corresponding to the two-dimensional bar code 510. The display controller 102 provides display of the images of the operational interfaces 410 at the corrected coordinate locations of the operational interfaces 410 in the manner in which the images of the operational interfaces 410 are superimposed on the virtual reality image 400. With this configuration, when the haptic devices 30 are not disposed at proper locations, the displayed locations of the two-dimensional bar codes 510 displayed on the liquid crystal displays 36 in the real space are made coincident with the coordinate locations of the operational interfaces 410 in the virtual space corresponding to the two-dimensional bar codes 510. As a result, the user 2 can exactly operate the operational interfaces 410 in the virtual space.

The embodiments of the disclosure have been described above with reference to the accompanying drawings, but the disclosure is not limited to the embodiments. It is understood that various modifications and alterations within the scope indicated in the claims may occur to those skilled in the art, and these are also embraced within the technical scope of the disclosure.

For example, in the above descriptions of the embodiments, the haptic device 30 is shaped as a rectangular plate, but this example is not to be interpreted as limiting. The haptic device 30 may be shaped as, for example, a polygonal plate or curved shape.

The series of operations performed by the flight simulation system 1 according to the embodiments described above may be implemented by software, hardware, or a combination of software and hardware. A program as software is previously stored in, for example, non-transitory media provided inside or outside the individual devices. The program is, for example, read from a non-transitory storage medium (for example, ROM), loaded on a temporary storage medium (for example, a RAM), and run by a processor such as a CPU.

According to the embodiments described above, a program configured to execute a process implementing the functions of the flight simulation system 1 may be provided. Furthermore, a computer-readable non-transitory storage medium storing the program may be provided. The non-transitory storage medium may be, for example, a disk storage medium such as an optical disk, magnetic disk, or magneto-optical disk, or a semiconductor memory such as a flash memory or USB flash drive.

The control device 10 illustrated in FIGS. 1, 4, and 6 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 10 including the controller 100, the display controller 102, the touch location receiver 104, the determiner 106, the vibration controller 108, and the coordinate location database 110, or the control device 10 including the controller 100, the display controller 102, the touch location receiver 104, the determiner 106, the vibration controller 108, the coordinate location database 110, the identification information display controller 200, the identification information receiver 202, and the coordinate location corrector 204. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIGS. 1, 4, and 6.

The invention claimed is:

1. A flight simulation system configured to perform flight simulation of models of aircrafts, the flight simulation system comprising:
   a head-mounted display wearable by a user, the head-mounted display being configured to display a virtual reality image of a cockpit of an aircraft in a virtual space;
   a haptic device disposed in a real space at a location corresponding to operational interfaces provided in the cockpit in the virtual reality image; and
   a control device configured to control the flight simulation using the head-mounted display and the haptic device, wherein the haptic device comprises
   a touch sensor configured to detect a touch location touched by the user on the haptic device, and
   a vibrator configured to cause a vibration at the touch location,
the control device comprises
   a processor, and
   a memory configured to store coordinate data indicating coordinate locations of the operational interfaces provided in the cockpit of each of the models, and
the processor is configured to execute a process comprising
   performing flight simulation of a model selected by the user from the models,
   causing the head-mounted display to display the virtual reality image picturing the operational interfaces of the selected model,
   when the user touches the haptic device, causing the vibrator to cause a vibration at the touch location,
   based on the coordinate data of the selected model and the touch location, identifying an operational interface corresponding to the touch location among the operational interfaces of the selected model, and
   applying a change based on an operation performed on the identified operational interface to the flight simulation of the selected model.

2. The flight simulation system according to claim 1, wherein the process further comprises
   when the user touches the haptic device, changing a vibration mode of the vibrator depending on a kind of the identified operational interface.

3. The flight simulation system according to claim 2, wherein
   the head-mounted display comprises an imager configured to capture an image of a surrounding environment around the head-mounted display in the real space,
   the haptic device further comprises a display configured to display identification information of the operational interfaces at locations corresponding to the operational interfaces in the real space, and
   the process further comprises
      providing display of one or more operational interfaces of the operational interfaces corresponding to the identification information captured by the imager in a manner in which the one or more operational interfaces are superimposed on the virtual reality image displayed on the head-mounted display.

4. The flight simulation system according to claim 3, wherein the process further comprises
   based on the locations of the identification information captured by the imager, correcting the coordinate locations of the one or more operational interfaces superimposed on the virtual reality image.

5. The flight simulation system according to claim 2, wherein
   the head-mounted display comprises a posture sensor configured to sense a motion of a head of the user wearing the head-mounted display, and
   the process further comprises
      based on a detection result from the posture sensor, changing a displayed appearance of the cockpit in the virtual reality image displayed on the head-mounted display in association with the motion of the head of the user wearing the head-mounted display.

6. The flight simulation system according to claim 1, wherein the head-mounted display comprises an imager configured to capture an image of a surrounding environment around the head-mounted display in the real space, the haptic device further comprises a display configured to display identification information of the operational interfaces at locations corresponding to the operational interfaces in the real space, and the process further comprises providing display of one or more operational interfaces of the operational interfaces corresponding to the identification information captured by the imager in a manner in which the one or more operational interfaces are superimposed on the virtual reality image displayed on the head-mounted display.

7. The flight simulation system according to claim 6, wherein the process further comprises based on the locations of the identification information captured by the imager, correcting the coordinate locations of the one or more operational interfaces superimposed on the virtual reality image.

8. The flight simulation system according to claim 1, wherein the head-mounted display comprises a posture sensor configured to sense a motion of a head of the user wearing the head-mounted display, and the process further comprises based on a detection result from the posture sensor, changing a displayed appearance of the cockpit in the virtual reality image displayed on the head-mounted display in association with the motion of the head of the user wearing the head-mounted display.

\* \* \* \* \*